US012081603B1

(12) United States Patent
Beckmann et al.

(10) Patent No.: US 12,081,603 B1
(45) Date of Patent: Sep. 3, 2024

(54) CONTROLLING PRESENTATIONS IN VIDEO CONFERENCES

(71) Applicant: Zoom Video Communications, Inc., San Jose, CA (US)

(72) Inventors: John Andrew Alexander Beckmann, San Francisco, CA (US); Ailian Gan, San Francisco, CA (US); Michelle Koike, Saulsalito, CA (US); Hailei Sheng, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/459,571

(22) Filed: Sep. 1, 2023

Related U.S. Application Data

(63) Continuation of application No. 17/472,246, filed on Sep. 10, 2021, now Pat. No. 11,757,957.

(51) Int. Cl.
*H04L 65/4038* (2022.01)
*G06F 3/14* (2006.01)

(52) U.S. Cl.
CPC ........ *H04L 65/4038* (2013.01); *G06F 3/1454* (2013.01)

(58) Field of Classification Search
None
See application file for complete search history.

(56) References Cited

U.S. PATENT DOCUMENTS

| | | | | |
|---|---|---|---|---|
| 11,221,760 B2* | 1/2022 | Kubo | ............... | G06F 3/04883 |
| 11,443,560 B1* | 9/2022 | Wright | ............... | G06V 10/44 |
| 2011/0078560 A1* | 3/2011 | Weeldreyer | ........... | G06F 3/0488 |
| | | | | 715/255 |
| 2012/0147125 A1* | 6/2012 | MacDonald | ............. | H04N 7/15 |
| | | | | 348/E7.083 |
| 2016/0029094 A1* | 1/2016 | Cheung | .............. | H04N 21/4788 |
| | | | | 725/43 |
| 2016/0343351 A1* | 11/2016 | Chen | ...................... | G09G 5/005 |
| 2021/0400237 A1* | 12/2021 | Amiri | ..................... | H04L 51/08 |
| 2023/0023431 A1* | 1/2023 | Christensen | ......... | G06V 10/751 |

* cited by examiner

*Primary Examiner* — Toan H Vu
(74) *Attorney, Agent, or Firm* — Kilpatrick Townsend & Stockton LLP

(57) ABSTRACT

One example method for controlling presentations in video conferences includes displaying, by a video conference application executing on a first client device, a first slide of a plurality of slides in a slide presentation as part of a visual display of a video conference on the first client device; receiving, by the video conference application executing on the first client device from the video conference application executing on a second client device, a first command to display a second slide, wherein the first command is issued by a first user of a plurality of users of the video conferencing application authorized to control the slide presentation; displaying, by the video conference application executing on the first client, the second slide in response to receiving the first command; receiving, by the video conference application executing on the first client device from the video conference application executing on a third client device, a second command to display a third slide, wherein the second command is issued by a second user of the plurality of users of the video conferencing application authorized to control the slide presentation; and displaying, by the video conference application executing on the first client, the third slide in response to receiving the first command.

17 Claims, 8 Drawing Sheets

CONTROLLING PRESENTATIONS IN VIDEO CONFERENCES

This application is a continuation of U.S. patent application Ser. No. 17/472,246, filed Sep. 10, 2021, titled "Controlling Presentations In Video Conferenced," the entirety of which is hereby incorporated by reference.

FIELD

The present application generally relates to video conferencing and more particularly relates to controlling presentations in video conferences.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

SUMMARY

Various examples are described for controlling presentations in video conferences. These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
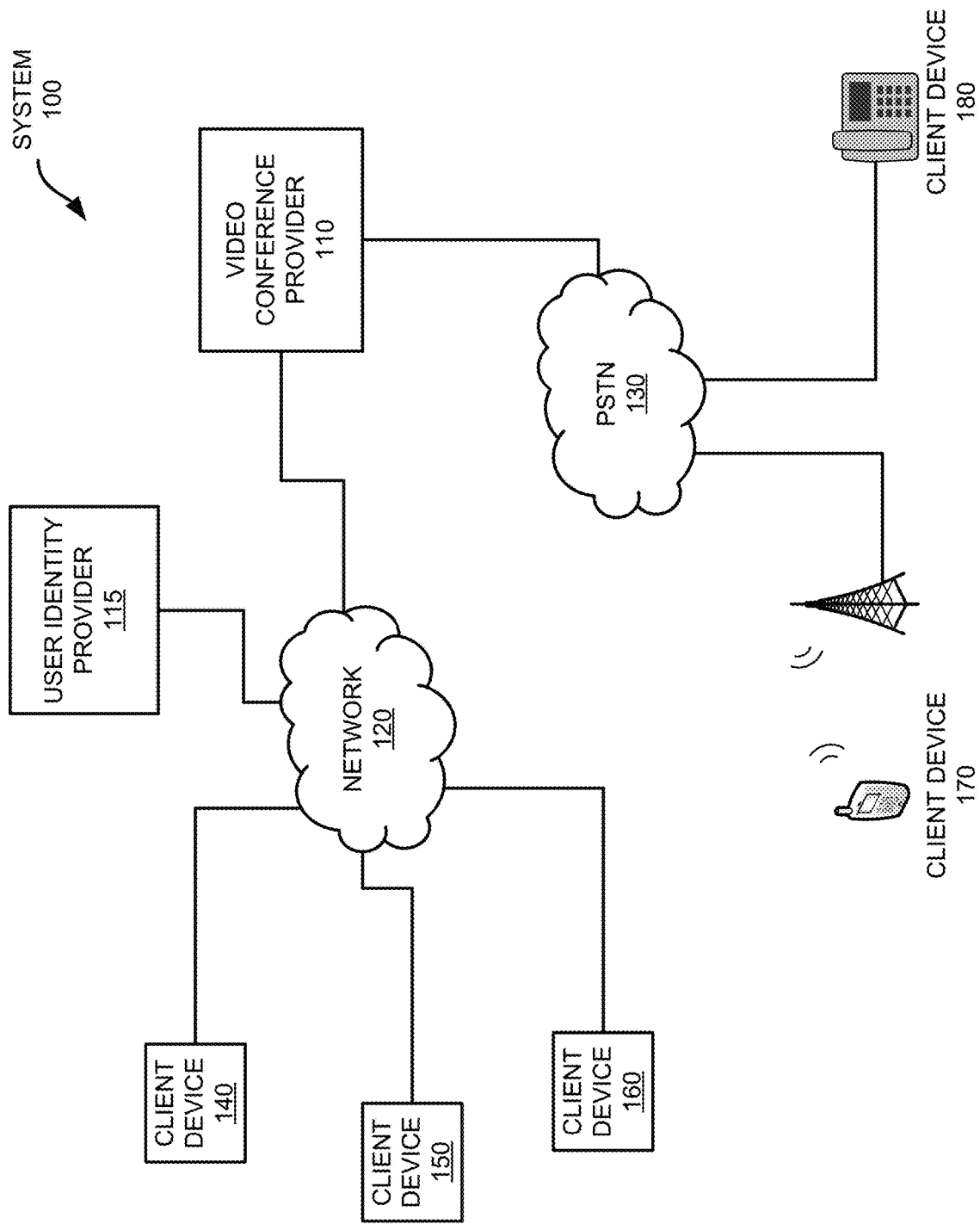
FIGS. 1-2 show example systems for controlling presentations in video conferences.

Examples are described herein in the context of controlling presentations in video conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During a video conference, a host may have information displayed on the host's client device that the host wishes to share with the attendees of the video conference. In such circumstances, the host can share the screen on which the information is displayed. One example of such information is a slide presentation displayed by a slide presentation application. Such slide presentations include a plurality of slides.

Often, the host may collaborate with attendees in the video conference to present the slides. For example, the host and two other attendees may provide a joint presentation to the remainder of the attendees of the video conference. In such situations, it would be advantageous to allow multiple attendees, including the host, to control the presentation.

An example system allows the host executing the video conferencing application to authorize multiple users in the video conference to control the slide presentation software in order to move from a first slide to a second slide or from a third slide to a fourth slide. In the example system, the host selects a user and provides an indication that the user is authorized. The user's client device, which is executing the same video conferencing software, receives the indication and notifies the user that authorization has been granted.

Once authorization has been granted, the second user can issue a command, such as "move to next slide." The user's command is transmitted to the client device of the host. When the host's client device receives the command, it causes the slide presentation software to move from the first slide to the second slide. The host may provide such authorization to more than one of the video conference attendees. For instance, the host and two other attendees may give a joint presentation. Alternatively, the host may begin the presentation but allow other attendees to control the presentation without further input from the host.

In some example systems, the host may wish to revoke authorization from one or more attendees. In a manner similar to authorization, the host selects the user for which to revoke authorization and issues the command to do so. The user whose authorization is revoked receives an indication at a client device that authorization is revoked and may no longer issue commands to the slide presentation software.

Such example systems operate within the video conferencing system. They may be compatible with a plurality of slide presentation software applications. Examples of such applications include Microsoft's PowerPoint, Apple's Keynote, Google Slides, or other similar presentation software applications.

One example method for controlling presentations in video conferences includes displaying, by a video conference application executing on a first client device, a first slide of a plurality of slides in a slide presentation as part of a visual display of a video conference on the first client device, receiving, by the video conference application executing on the first client device from the video conference application executing on a second client device, a command to display a second slide, wherein the command is issued by a first user of a plurality of users of the video conferencing application authorized to control the slide presentation; and displaying, by the video conference application executing on the first client, the second slide in response to receiving the command.

One example non-transitory computer-readable medium includes processor-executable instructions configured to cause one or more processors to display, by a video conference application executing on a first client device, a first slide of a plurality of slides in a slide presentation as part of a visual display of a video conference on the first client device, receive, by the video conference application executing on the first client device from the video conference application executing on a second client device, a command to display a second slide, wherein the command is issued by a first user of a plurality of users of the video conferencing application authorized to control the slide presentation, and display, by the video conference application executing on the first client, the second slide in response to receiving the command.

One example device comprises a communications interface, a non-transitory computer-readable medium, and one or more processors configured to execute processor-executable instructions stored in the non-transitory computer-readable medium to processor-executable instructions configured to cause one or more processors to display, by a video conference application executing on a first client device, a first slide of a plurality of slides in a slide presentation as part of a visual display of a video conference on the first client device, receive, by the video conference application executing on the first client device from the video conference application executing on a second client device, a command to display a second slide, wherein the command is issued by a first user of a plurality of users of the video conferencing application authorized to control the slide presentation, and display, by the video conference application executing on the first client, the second slide in response to receiving the command.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
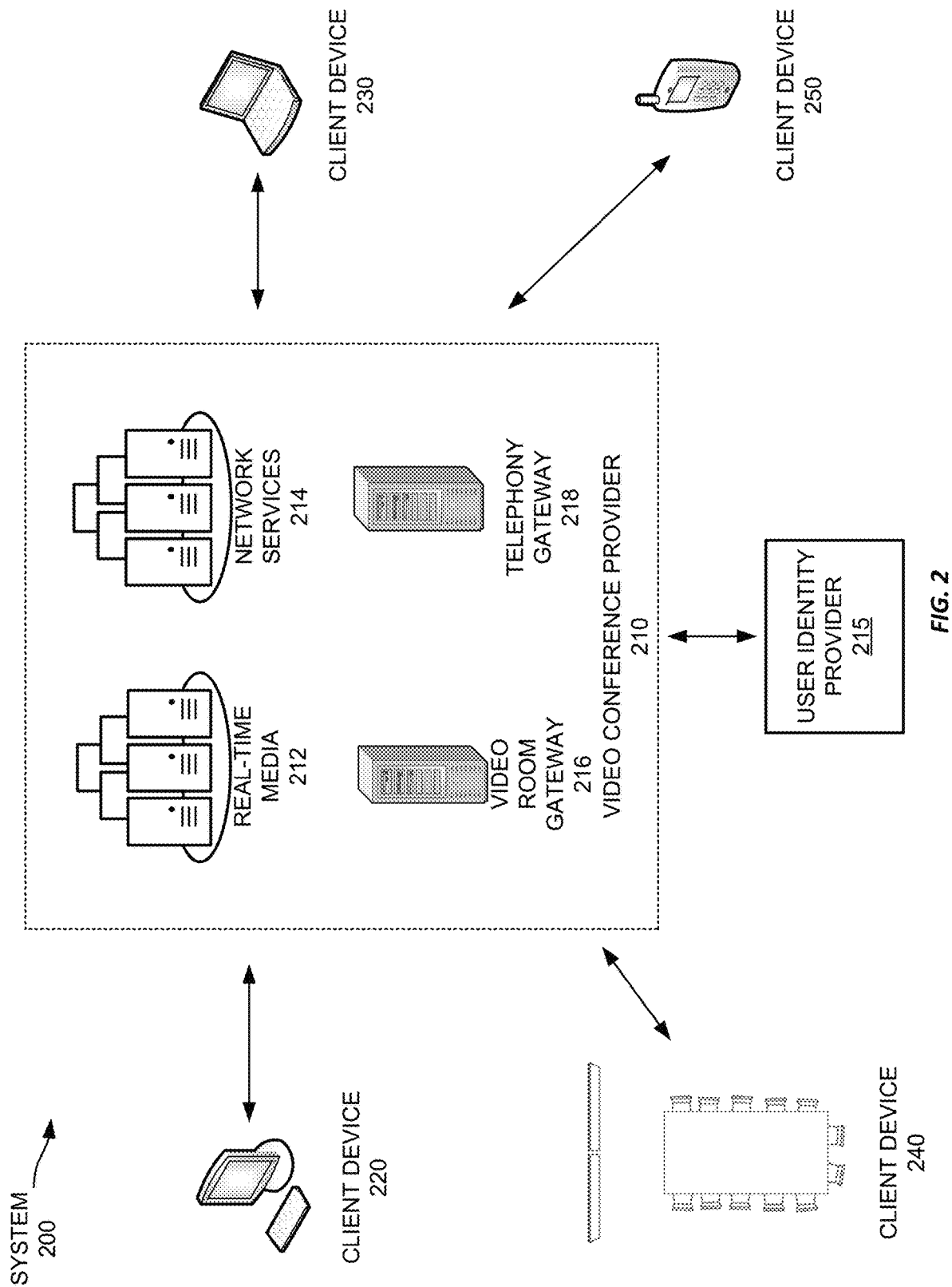

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110. If such users are able to attend a meeting in which a list of attendees is create, such users may not appear in the list of attendees that are present or have not yet joined or may be represented by some sort of indicator, such as a randomly-generated identifier.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
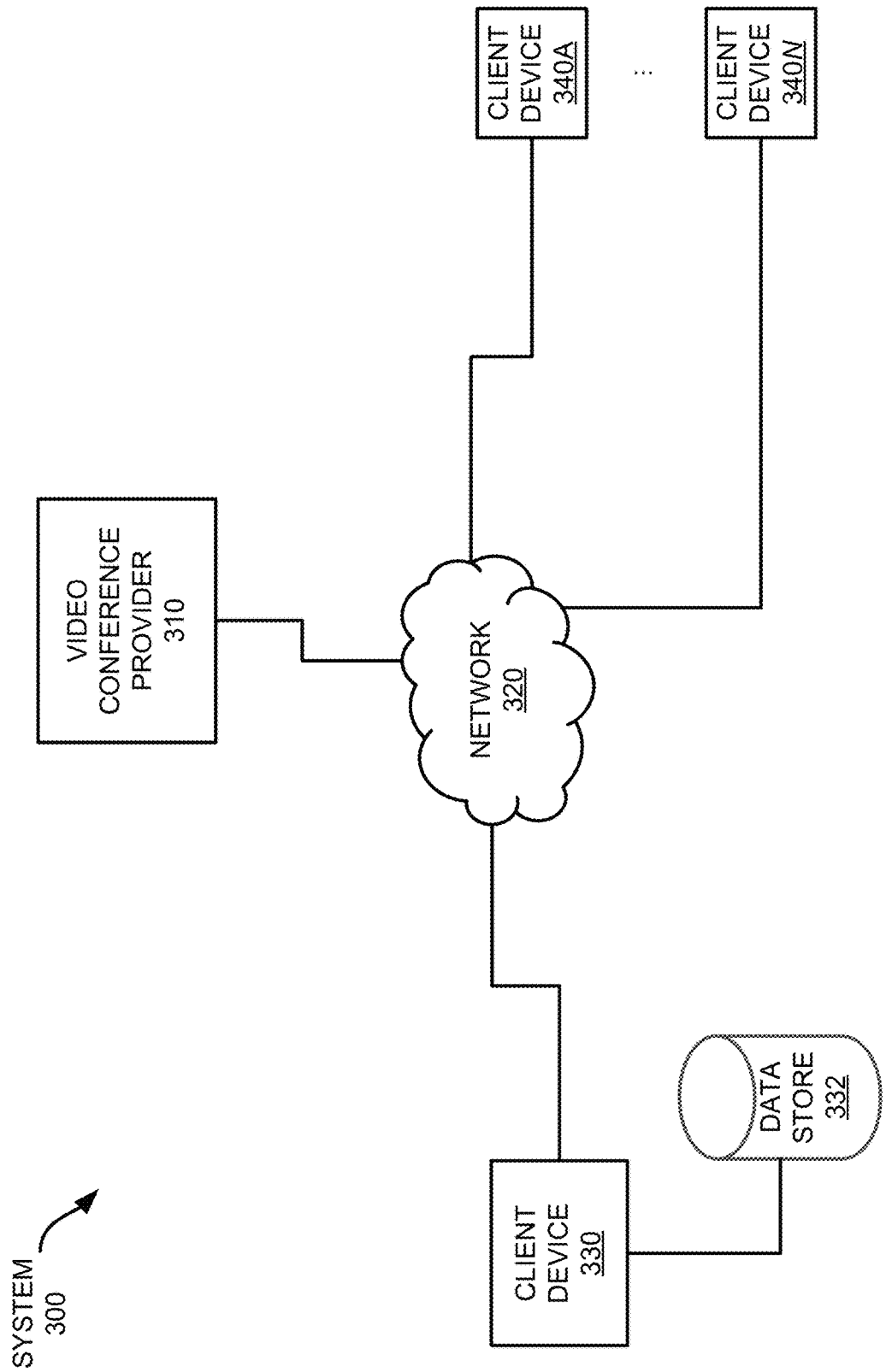
FIG. 3 shows an example system for controlling presentations in video conferences.

Referring now to FIG. 3, FIG. 3 shows an example system 300 for controlling presentations in video conferences. In this example system 300, a number of client device 330, 340*a-n* are connected to a video conference provider 310 via a communications network 320. In this example, the communications network 320 is the internet, however, any suitable communications network or combination of communications network may be employed, including LANs (e.g., within a corporate private LAN), WANs, etc.

Each client device 330, 340*a-n* executes video conference software, which connects to the video conference provider 310 and joins a meeting. During the meeting, the various participants (using video conference software at their respective client devices 330, 340*a-n*) are able to interact with each other to conduct the meeting, such as by viewing video feeds and hearing audio feeds from other participants, and by capturing and transmitting video and audio of themselves.

During the meeting, a participant hosting the video conference using client device 330 executes a software application, such as a slide presentation application to display slides. In order to allow attendees of the video conference to see the slide presentation within the video conference application executing on client devices 340*a-n*, the host shares a screen on which the slides are displayed. In response to issuing the share command, the slide presentation is now visible on client devices 340*a-n*.

The host may also authorize a plurality of users using client devices 340*a-n* to issue commands to the slide presentation application executing on the host's client device 330. Once the host has done so, then the other authorized users may issue commands, such as "next slide," to the slide presentation application executing on the client device 330. Once the command is issued, the slide presentation application will advance the slide presentation to the next slide, and all participants will then be presented with and be able to view the next slide in the presentation. Example systems may be used with other types of shared content. For instance, multiple users may wish to narrate a video during a video conference. In such an example, each of the users may wish to exercise control over the video, such as by starting and stopping the video. Any such shared content may be utilized in example systems.

To help illustrate how a software application, e.g., software application 360, may interact with a video conferencing application, e.g., video conferencing application 350, to create a customized video conference experience, reference will be made to FIGS. 4 through 7, which illustrate different example representations of a video conference.

Figure 4:
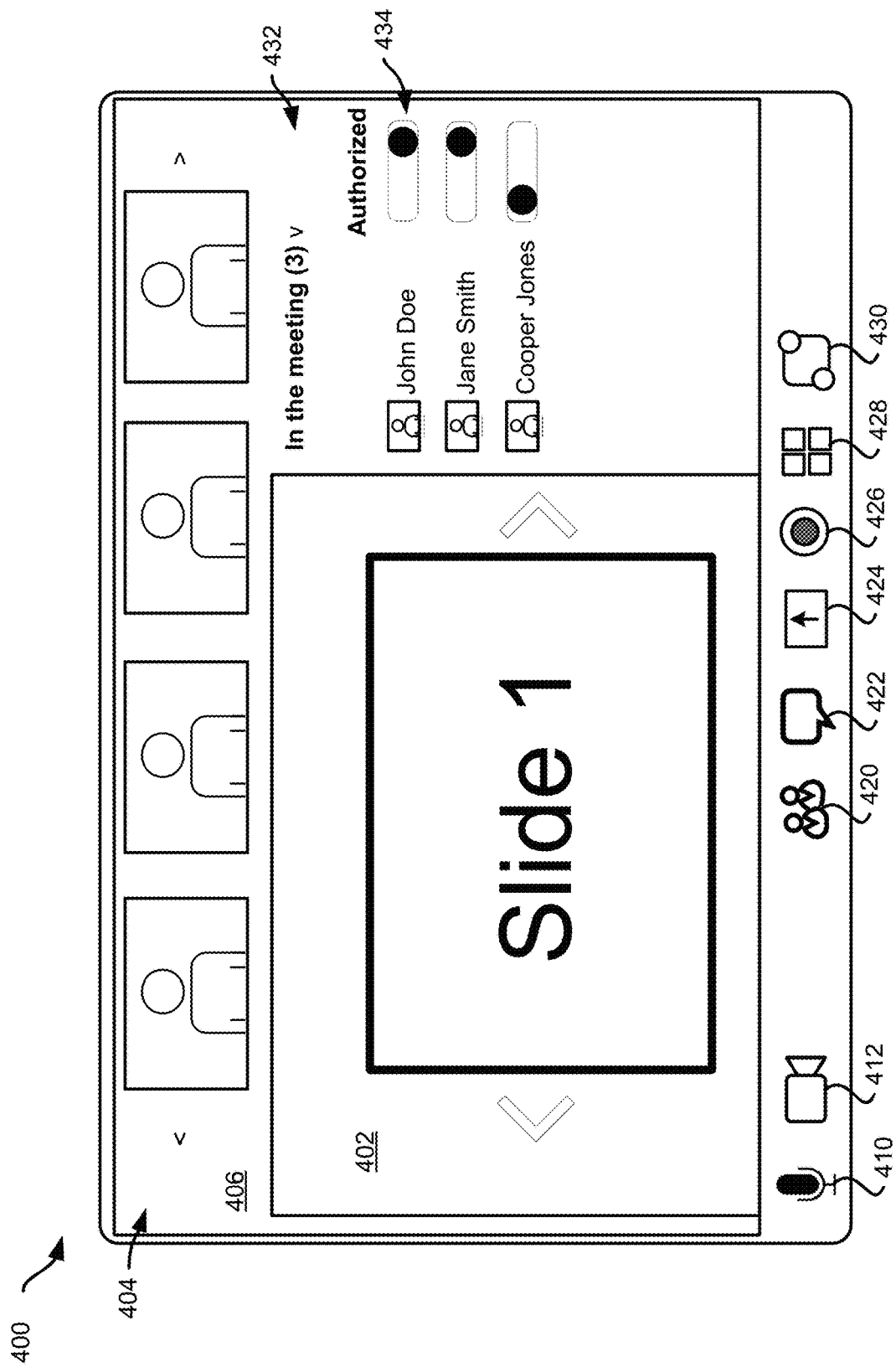
FIG. 4 shows an example graphical user interface for controlling presentations in video conferences.

Referring now to FIG. 4, FIG. 4 shows an example GUI 400 presented to participants in a video conference. A client device, e.g., client device 330 or client devices 340*a-n*, executes video conferencing software, which in turn displays the GUI 400 on the client device's display. In this example, the GUI 400 includes a shared screen view window 402 in which a shared presentation can be viewed during the video conference. The presentation is displaying a first slide of a presentation that is displayed by a slide presentation application executing on client device 330. The shared screen view window 402 also includes controls ("<" and ">") for advancing to a second slide or moving back.

Above the shared screen view window 402 are smaller participant windows 404, which allow the participant to view some of the other participants in the video conference, as well as controls ("<" and ">") to let the host scroll to view other participants in the video conference. Both the shared screen view window 402 and the participant windows are overlaid on a background 406, which is a solid black background in the default GUI 400.

Beneath the shared screen view window 402 are a number of interactive elements 410-428 to allow the participant to interact with the video conference software. Controls 410-412 may allow the participant to toggle on or off audio or video streams captured by a microphone or camera connected to the client device. Control 420 allows the participant to view any other participants in the video conference with the participant, while control 422 allows the participant to send text messages to other participants, whether to specific participants or to the entire meeting. Control 424 allows the participant to share content from their client device. Control 426 allows the participant toggle recording of the meeting, and control 428 allows the user to select an option to join a breakout room. Finally, control 430 allows the participant to launch an application, which may integrate content into the video conference as described within this disclosure.

The GUI 400 also includes lists of users who have been invited to the meeting by the host and are presently participating in the meeting 432. In the example shown, next to each participating user's name is a control 434. The control is a slide and the position of the slide indicates whether a particular user is authorized to control the slide presentation software displayed in the shared screen window view 402. In the example shown, the control 434 is set such that John Doe is authorized to control the slide presentation. For example, John Doe may issue a "next slide" command from a client device, such as client devices 340*a-n*. The host may use the control 434 to authorize or revoke authorization from a user.

Figure 5:
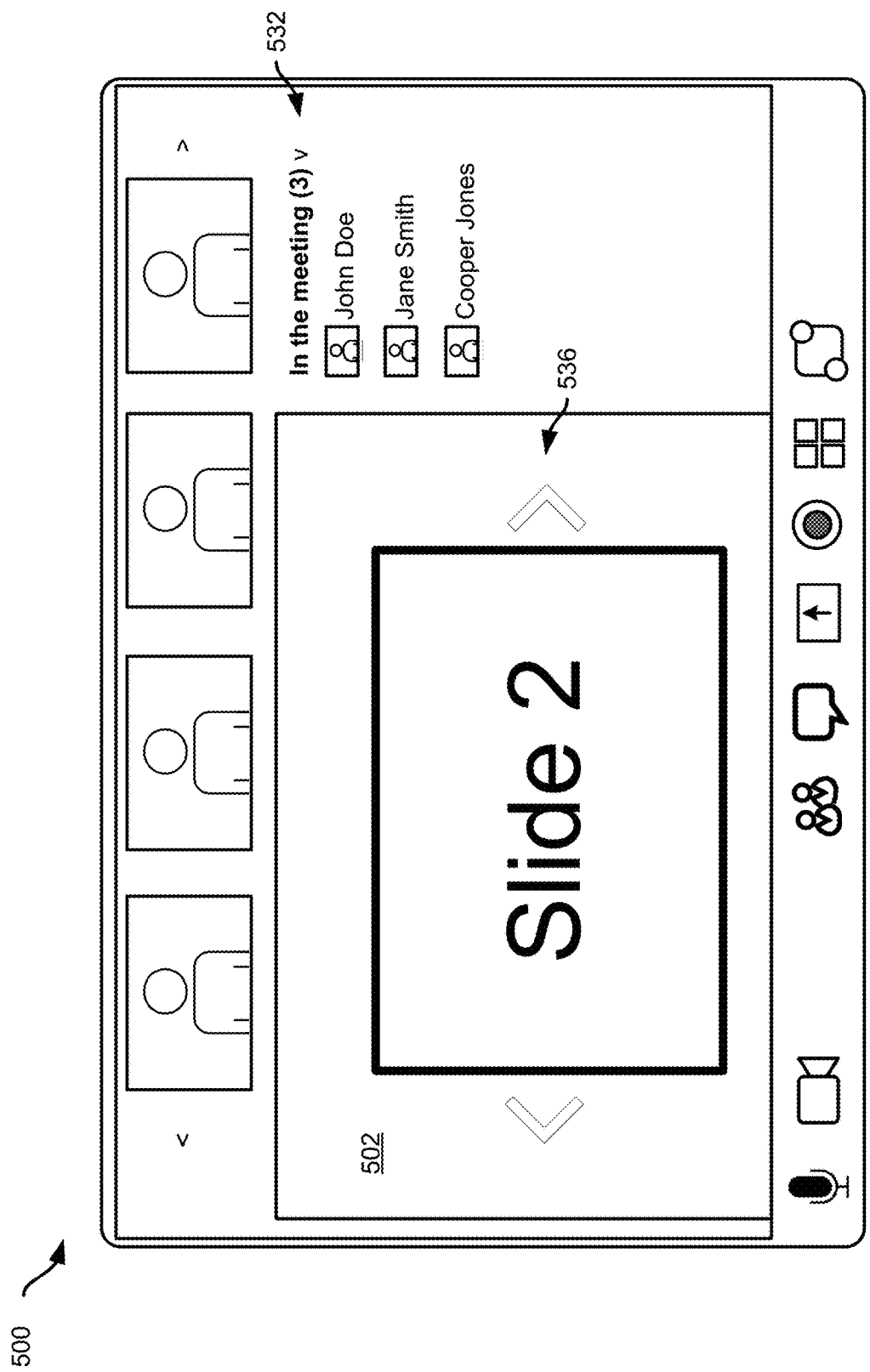
FIG. 5 shows another example graphical user interface for controlling presentations in video conferences.

Referring now to FIG. 5, FIG. 5 shows an example GUI 500 similar to GUI 400, except from the perspective of a user that is not the host. For instance, GUI 500 may be the view of user John Doe. Similar to the GUI 400 of FIG. 4, GUI 500 includes a list of users in the meeting 532. But the list includes no authorization control 434.

The user of GUI 500 has been authorized to control the slide presentation displayed in GUI 400. Thus controls, such as control 536, are presented in the shared screen window view 502. By clicking on control 536, the user of GUI 500 is able to issue a command to the client device 330 to advance the slide presentation. Subsequent to issuing the command, Slide 2 is displayed in shared screen window view 502 and is displayed to all participants, including the host using GUI 400.

While the GUI examples shown in FIGS. 4 and 5 include only two controls for moving slides, in some examples, the second user may be authorized to issue additional commands or type of commands to the shared application. For example, the user of GUI 500 may be able to issue a command to play a video embedded in Slide 2. In some examples, the control 434 is only visible to the host or to alternate hosts. In other examples, any user with authorization to control the slides may be able to authorize or revoke other users.

Figure 6:
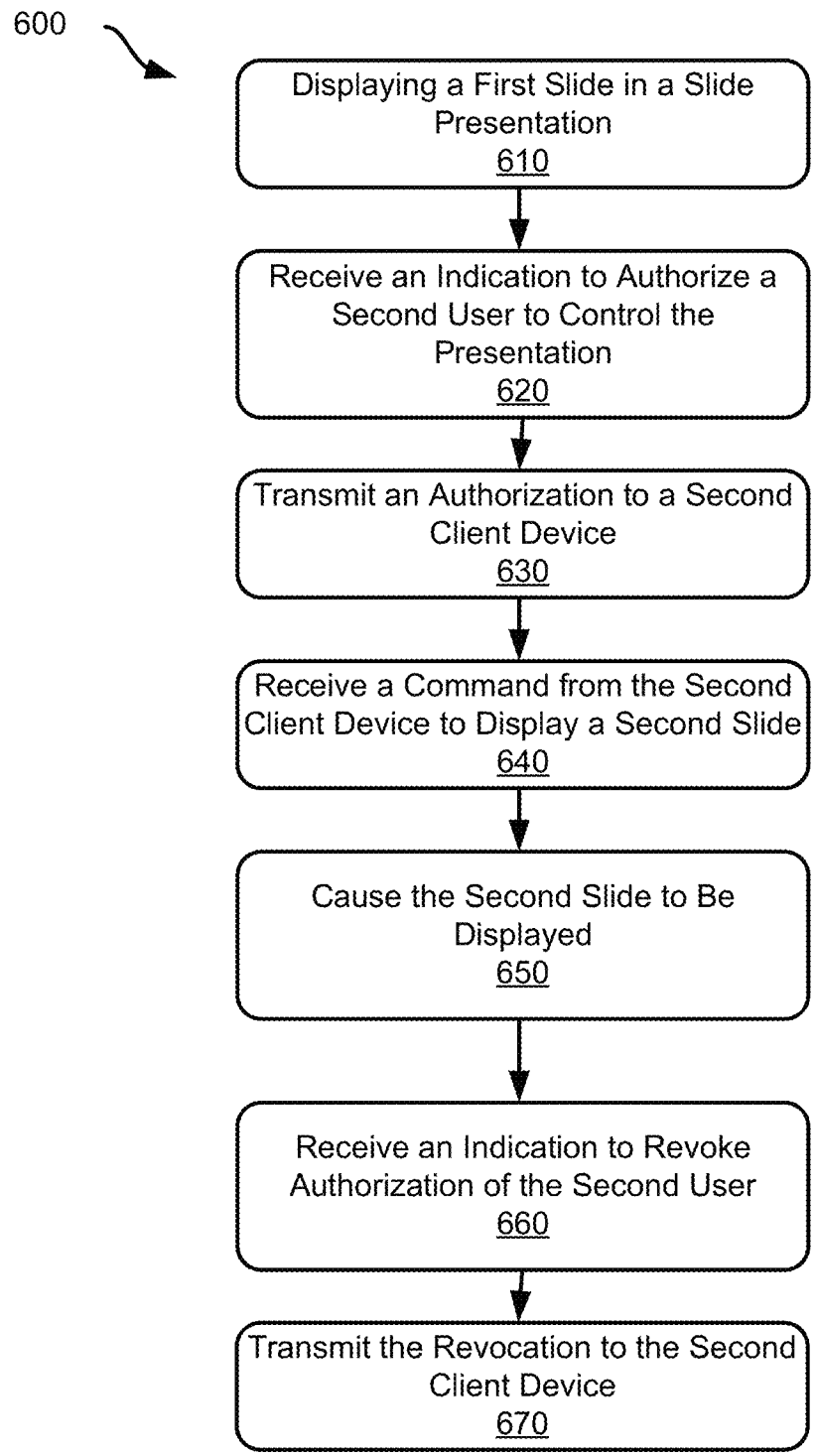
FIGS. 6 and 7 show example methods for controlling presentations in video conferences.

Referring now to FIG. 6, FIG. 6 shows an example method 600 for controlling presentations in video conferences from the perspective of a video conference provider. This example method 600 will be described with respect to the system shown in FIG. 3 and the GUI examples in FIGS. 4 and 5; however, any suitable system according to this disclosure may be employed.

At block 610, a video conference application executing on a client device 330 displays a first slide in a slide presentation. For instance, a host executing the video conferencing application may retrieve a slide presentation from data store 320. Once the slide presentation application executes and displays the slide on client device 330, the host can choose to share a screen in GUI 400. Sharing the screen causes the share screen window 402 to be displayed on client device 330. The same slide and share screen window 402 is then displayed on all client devices 340a-n displaying the video conference.

At block 620, the video conferencing application receives an indication from the host to authorize a second user to control the presentation displayed in window 402. For instance, the host may use a slide control 434 to authorize user John Doe to control the slide presentation.

At block 630, the video conferencing application executing on client device 330 transmits an authorization to a second client device, such as client device 340a. At the second client device 340a, a second user is presented with a notification in the GUI 500 indicating that the second user now has the ability to control the slide presentation. For instance, the second use can use the control 536 to advance from Slide 1 shown in GUI 400 to Slide 2 displayed in GUI 500. Once the second user has been authorized to control the slide presentation, the user then clicks on control 536 in order to advance to the next slide, Slide 2 displayed in shared window view 502. When the user clicks on the control 536, the command to advance to the next slide and display the second slide is transmitted to the first client device 330.

At block 640, the first client device receives the command from the second client device 340a to display a second slide. At block 650, the video conferencing application causes the slide presentation software to display the second slide. The second slide is displayed in shared window view 402 and also on all the other GUI's on client devices 340a-n, such as GUI 500 in FIG. 5.

At block 660, the host decides to revoke the authorization from the second user and issues a command to do so. For instance, the host may utilize control 434 to revoke access to John Doe by, for example, moving the slider to the left. The video conference application executing on the first client device 330 receives the indication.

At block 670, the video conferencing application executing on client device 330 transmits the revocation to the second client device 340a. In response the second client device may change GUI 500 and remove controls, such as the advance slide control 536. The authorization and revocation of users illustrated at blocks 620-630 and 660-670 may be executed for a plurality of users. For example, the host may authorize a second user and a third user by sending first and second indications authorizing the second and third users to control the slides.

Figure 7:
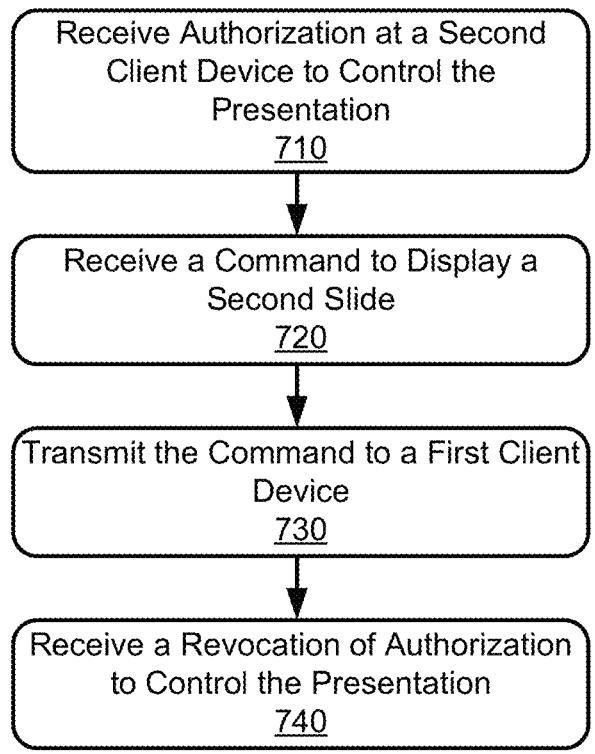

Referring now to FIG. 7, FIG. 7 shows an example method 700 for controlling presentations in video conferences from the perspective of the second user using the second client device 340a displaying the GUI 500 in FIG. 5. This example method 700 will be described with respect to the system shown in FIG. 3 and the GUI in FIG. 5; however, any suitable system according to this disclosure may be employed.

At block 710, the second client device 340a receives authorization for the second user to control the presentation displayed in GUI 500 on client device 340a. In response, the video conferencing application executing on client device 340a displays additional controls, such as control 536 to the second user. The second user can then click on the control 536.

At block 720, the second user clicks the control 536 to advance the slide. The client device 340a receives the command to display a second slide from the video conferencing application.

At block 730, the second client device 340a then transmits the command to a first client device 330. In response to receiving the command, the first client device 330 causes the slide presentation software to display the next slide as depicted in shared window view of GUI 500.

At block 740, the host has revoked the access of the second user, and the second client device 340a receives the revocation of the authorization to control the slides. Once the revocation has been received, the video conference application executing on the second client device 340a removes the controls, such as control 536, that allow the second user to control the slide presentation.

While the process in FIG. 7 is depicted as occurring once, it may be repeated throughout the duration of the video conference. For example, a host may authorize one more users to control the presentation during a specific time period and then revoke that access for a period of time. Or the host may authorize certain users at certain times, at the beginning of the presentation for example, and then other users at other times, for example at the end of the presentation.

Such systems and methods for controlling presentations in a video conference provide numerous advantages. When multiple users are presenting jointly during a video conference, only one user, typically the host, can control the presentation at any one time. If a second user wishes to advance the slides or move to a specific slide, the second user must verbally ask the host to advance the slides. This can be particularly difficult if three or more users are presenting simultaneously. Example systems provide a more effective mechanism for jointly presenting such material. Example systems may not be limited to presenting slides as such collaboration may be useful in other types of applications, such as video applications that users are describing during a presentation.

Figure 8:
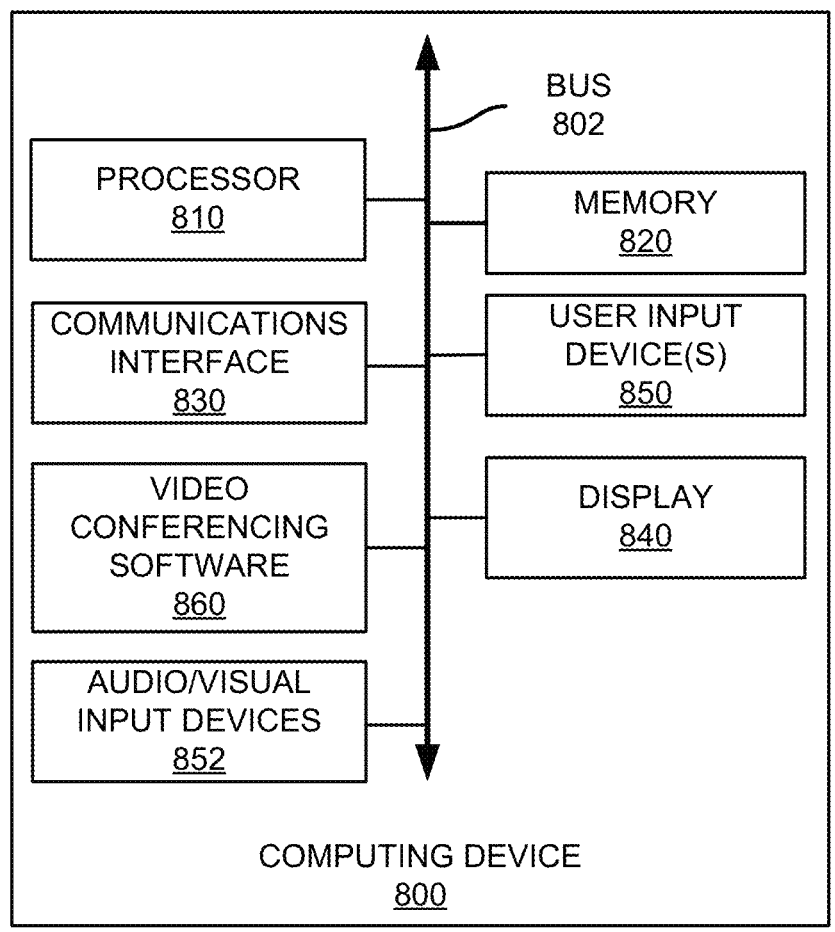
FIG. 8 shows an example computing device suitable for use with example systems and methods for controlling presentations in video conferences.

Referring now to FIG. 8, FIG. 8 shows an example computing device 800 suitable for use in example systems or methods for controlling presentations in video conferences according to this disclosure. The example computing device 800 includes a processor 88 which is in communication with the memory 820 and other components of the computing device 800 using one or more communications buses 802. The processor 88 is configured to execute processor-executable instructions stored in the memory 820 to perform one or more methods for providing dynamic content to video conference waiting rooms according to different examples, such as part or all of the example method described above with respect to FIG. 6. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes video conference software 860 to enable a user to join and participate in a video conference, such as a conventional meeting or webinar, by receiving multimedia streams from a video conference provider, sending multimedia streams to the video conference provider, joining and leaving breakout rooms, providing software application content, etc. such as described throughout this disclosure, etc.

The computing device 800 also includes a communications interface 840. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
displaying, by a video conference application executing on a first client device, a first slide of a plurality of slides in a slide presentation as part of a visual display of a video conference on the first client device;
receiving, by the video conference application executing on the first client device from the video conference application executing on a second client device, a first command to display a second slide, wherein the first command is issued by a first user of a plurality of users of the video conferencing application authorized to control the slide presentation;
displaying, by the video conference application executing on the first client, the second slide in response to receiving the first command;
receiving, by the video conference application executing on the first client device from the video conference application executing on a third client device, a second command to display a third slide, wherein the second command is issued by a second user of the plurality of users of the video conferencing application authorized to control the slide presentation; and
displaying, by the video conference application executing on the first client, the third slide in response to receiving the first command.

2. The method of claim 1, further comprising:
receiving, by the video conference application executing on the first client device, a first indication from a host of the video conference that the first user of the plurality of users of the video conference application executing on the second client device is authorized to issue the command to display the second slide; and
sending a first notification to the second client device in response to the first indication.

3. The method of claim 2, further comprising:
receiving, by the video conference application executing on the first client device, a second indication from the host of the video conference that the second user of the plurality of users of the video conference application executing on the third client device is authorized to issue the command to display the second slide; and sending a second notification to the third client device in response to the second indication.

4. The method of claim 3, wherein the first user and the second user are simultaneously authorized to issue the first command and the second command.

5. The method of claim 4, wherein authorizing the first user and the second user comprises designating the first user and the second user as co-hosts of the video conference.

6. The method of claim 2, further comprising modifying a graphical user interface of the video conference application executing on the second client device to display a control for issuing the first command.

7. The method of claim 1, further comprising: displaying, by the video conference application executing on the second client, the second slide; and displaying, by the video conference application executing on the third client, the second slide.

8. A non-transitory computer-readable medium comprising processor-executable instructions configured to cause one or more processors to:
   display, by a video conference application executing on a first client device, a first slide of a plurality of slides in a slide presentation as part of a visual display of a video conference on the first client device;
   receive, by the video conference application executing on the first client device from the video conference application executing on a second client device, a first command to display a second slide, wherein the first command is issued by a first user of a plurality of users of the video conferencing application authorized to control the slide presentation;
   display, by the video conference application executing on the first client, the second slide in response to receiving the first command;
   receive, by the video conference application executing on the first client device from the video conference application executing on a third client device, a second command to display a third slide, wherein the second command is issued by a second user of the plurality of users of the video conferencing application authorized to control the slide presentation; and
   display, by the video conference application executing on the first client, the third slide in response to receiving the first command.

9. The non-transitory computer-readable medium of claim 8, further comprising processor-executable instructions configured to cause one or more processors to:
   receive, by the video conference application executing on the first client device, a first indication from a host of the video conference that the first user of the plurality of users of the video conference application executing on the second client device is authorized to issue the command to display the second slide; and
   send a first notification to the second client device in response to the first indication.

10. The non-transitory computer-readable medium of claim 9, further comprising processor-executable instructions configured to cause one or more processors to:
    receive, by the video conference application executing on the first client device, a second indication from the host of the video conference that the second user of the plurality of users of the video conference application executing on the third client device is authorized to issue the command to display the second slide; and
    send a second notification to the third client device in response to the second indication.

11. The non-transitory computer-readable medium of claim 10, wherein the first user and the second user are simultaneously authorized to issue the first command and the second command.

12. The non-transitory computer-readable medium of claim 11, wherein authorizing the first user and the second user comprises designating the first user and the second user as co-hosts of the video conference.

13. The non-transitory computer-readable medium of claim 8, further comprising processor-executable instructions configured to cause one or more processors to modify a graphical user interface of the video conference application executing on the second client device to display a control for issuing the first command.

14. The non-transitory computer-readable medium of claim 8, further comprising processor-executable instructions configured to cause one or more processors to:
    display, by the video conference application executing on the second client, the second slide; and
    display, by the video conference application executing on the third client, the second slide.

15. A device comprising:
    a communications interface;
    a non-transitory computer-readable medium; and
    one or more processors configured to execute processor-executable instructions stored in the non-transitory computer-readable medium to:
    display, by a video conference application executing on a first client device, a first slide of a plurality of slides in a slide presentation as part of a visual display of a video conference on the first client device;
    receive, by the video conference application executing on the first client device from the video conference application executing on a second client device, a command to display a second slide, wherein the command is issued by a first user of a plurality of users of the video conferencing application authorized to control the slide presentation; and
    display, by the video conference application executing on the first client, the second slide in response to receiving the command
    receive, by the video conference application executing on the first client device, a first indication from a host of the video conference that the first user of the plurality of users of the video conference application executing on a second client device is authorized to issue the command to display the second slide; and
    send a first notification to the second client device in response to the first indication
    receive, by the video conference application executing on the first client device, a second indication from the host of the video conference that a second user of the plurality of users of the video conference application executing on a third client device is authorized to issue the command to display the second slide; and
    send a second notification to the third client device in response to the second indication.

16. The device of claim 15, further comprising processor-executable instructions configured to cause one or more processors to:
    receive, by the video conference application executing on the first client device, a first indication from a host of the video conference that the first user of the plurality of users of the video conference application executing on the second client device is authorized to issue the command to display the second slide; and send a first notification to the second client device in response to the first indication.

17. The device of claim 16, further comprising processor-executable instructions configured to cause one or more processors to:

receive, by the video conference application executing on the first client device, a second indication from the host of the video conference that the second user of the plurality of users of the video conference application executing on the third client device is authorized to issue the command to display the second slide; and send a second notification to the third client device in response to the second indication.

\* \* \* \* \*